Patented May 22, 1951

2,553,557

UNITED STATES PATENT OFFICE 2,553,557

PROCESS OF OBTAINING DRY CHLORINE GAS FROM A GASEOUS MIXTURE COMPRISING ELEMENTAL CHLORINE AS THE PRINCIPAL COMPONENT THEREOF

Clayton L. Dunning, Fairport Harbor, Ohio, assignor to Diamond Alkali Company, Cleveland, Ohio, a corporation of Delaware No Drawing. Application August 6, 1949, Serial No. 109,071

4 Claims. (Cl. 23—219)

This invention relates to a method for drying chlorine gas and more particularly relates to the removal by refrigeration of relatively small amounts of water from chlorine gas, which refrigeration is conducted in the presence of an inhibitor of the formation of solid chlorine hydrate.

The classical method for drying a gaseous mixture comprising chlorine, for example, that obtained from the electrolysis of an aqueous solution of sodium chloride, consists in passing the gas as obtained from the electrolysis and containing substantial quantities of water vapor, through a heat exchanger wherein the gas is cooled to a temperature below the dew point for the amount of water vapor therein but above the temperature at which a solid chlorine hydrate forms, i. e. within the range of 10° to approximately 35° C., suitably at about 15° C., to remove the bulk of the unwanted water, and subsequently passing the gas in countercurrent contact with a cooled discontinuous stream of concentrated sulfuric acid (95% to 99%) to remove substantially all of the remaining water.

Care must be exercised in the initial cooling step in order to prevent the formation of a solid hydrate of chlorine which forms at about 9.5° C., since such solid hydrate forming in the heat exchanger would necessarily interrupt what is otherwise a continuous partial drying operation. The subsequent step of passing the partially dried gaseous mixture, containing relatively small quantities of residual moisture, in countercurrent contact with concentrated sulfuric acid effects the final separation of all but the last minute traces of water from the mixture to the extent that the dried gas contains water only in amounts of the order of 1 to 2½ milligrams per liter.

While this method effectively dries the chlorine and is widely commercially used, it has the disadvantage of requiring the handling and storage of considerable quantities of concentrated sulfuric acid as well as necessitating the purification, disposal, or further use, of the acid upon its becoming diluted to the extent that the vapor pressure of the water in the acid reaches a point beyond which an undesirable amount of water remains associated with the chlorine gas.

Drying of chlorine by cooling impure relatively wet gas to a temperature somewhat above the boiling point of chlorine but below the temperature at which the chlorine hydrate is normally precipitated has not heretofore been practiced principally because the accumulation of the solid hydrate upon condenser surfaces eventually results in complete stoppage of the condenser apparatus and consequent interruption of the drying process. Moreover, when it is attempted to obtain dry chlorine gas by decomposing the hydrate at its melting point, the gas evolved during the decomposition of such hydrate necessarily carries with it an amount of moisture proportional to the partial pressure of water at the decomposition temperature. Hence, the product of such decomposition must be subjected to further drying before a usefully dry product is obtained.

The method of the present invention includes the steps of introducing a small proportion, relative to the amount of water vapor therein, of an inhibitor comprising hydrogen chloride into a gaseous mixture comprising chlorine, cooling the thus augmented gaseous mixture to a temperature above the boiling point of chlorine, i. e. —34° C. at atmospheric pressure, and below the dew point of the water vapor and hydrogen chloride present, and separating the gas phase from the liquid condensate formed during the aforesaid cooling step.

In practicing the method of the present invention, the chlorine containing gas stream from which it is desired to remove substantially all of the water moisture may be obtained from any one of several suitable sources. Examples of such gas mixtures are the gases issuing from electrolytic cells employed in the electrolysis of sodium chloride brine in the commercial production of caustic soda and chlorine from sodium chloride, the effluent gases from a reactor in which HCl is oxidized to elemental chlorine and water, as in the Deacon reaction, effluent gases issuing from the chlorination of organic materials, such as the effluent gases issuing from the chlorination of a paraffin hydrocarbon, which gases may contain appreciable quantities of elemental chlorine which it is desired to recover substantially free from water moisture, or any other convenient elemental chlorine containing mixture.

Where the source of the chlorine containing gas stream from which water vapor is to be removed is the gas stream issuing from electrolytic cells employed in the electrolysis of brine, or from a Deacon process type reactor, the drying may suitably be carried out by initially cooling the gas stream to a temperature slightly above that at which a solid chlorine hydrate is normally formed, i. e. 10° C., separating the gaseous chlorine from the liquid condensate, and subsequently admixing the partially dried chlorine containing gas stream with a relatively small proportion of hydrogen chloride sufficient to combine with the remaining water vapor to form, upon condensation, a hydrochloric acid solution and thus prevent the formation of solid chlorine hydrate. The initial cooling procedure allows for the removal of most of the water moisture contained in the gas prior to admixing hydrogen chloride therewith to effect the final drying at substantially lower temperatures, i. e. temperatures of the order of −30° to 0° C., and thus the greater amount of water moisture may be removed from the gas by the cheapest possible cooling means, i. e. water from either underground or surface sources; low temperature refrigeration is accordingly required only for the removal of the relatively small residual amounts of water contained in the gas.

For example, where the chlorine containing gas to be dried is obtained from a commercial operation for the electrolytic production of chlorine by the electrolysis of sodium chloride brine, the gases issuing from the cells are at a temperature of the order of 38° C. and are saturated with water vapor, the remainder of the gases in the mixture comprising substantially 95% elemental chlorine and approximately 5% atmospheric gases. Where the initial cooling step is effected by means of surface water whose temperature may vary seasonally from 13° C. to approximately 30° C., such cooling will reduce the water moisture contained in the gas mixture to a point within the range of approximately 1.5% to 4.25% by volume. After separating the chlorine containing gas from the liquid condensate obtained in this initial cooling step, a relatively small low-temperature differential across the refrigeration cooler effects sufficient further cooling of the gas to condense substantially all of the water moisture. Hydrogen chloride added in an amount to produce in the gas system an equivalent of 13% to 30% hydrochloric acid therein, i. e. from 0.15 to 0.55 of the weight of the water vapor remaining in the gas, completely inhibits the formation of chlorine hydrate and thus permits the refrigeration removal of residual water.

In the recovery of dry chlorine from the effluent gases issuing from a process wherein a hydrocarbon material is chlorinated with elemental chlorine, the method of the present invention is particularly effective in that it is readily integrable with a process for the recovery of aqueous HCl wherein conditions for the absorption of HCl in water are so controlled that suitable amounts of HCl escape with moist chlorine containing gases issuing from the absorber, and in that such gases may be cooled to the desired temperature below 0° C. without the necessity for adding HCl thereto.

In order that those skilled in the art may better understand the method of the present invention and by what means the same may be carried into effect, the following specific examples are offered:

*Example I*

Two glass tubes are fitted through a rubber stopper into the neck of an Erlenmeyer flask, into one of which tubes a glass wool plug is inserted at the level of the rubber stopper to act as an entrainment separator; this apparatus is inserted into a four-inch glass tube having a blind flange at one end upon which the Erlenmeyer flask with its fittings are supported. The remaining free space within the four-inch tube is filled with ethyl alcohol. Carbon dioxide snow is added to the body of alcohol from time to time until the temperature of the gases within the glass tubes has reached arbitrarily chosen points within the range of −25° C. to 0° C. as noted below.

The effluent gases from a chlorinator in which paraffin is chlorinated in solution in carbon tetrachloride, are passed through a water scrubber to remove substantially all of the hydrogen chloride, together with most of the carbon tetrachloride in such gases. The gas issuing from the scrubber is of the following approximate analysis:

| | Mol percent |
|---|---|
| Air | 57.6 |
| $Cl_2$ | 24.6 |
| HCl | 1.35 |
| $H_2O$ | 3.45 |
| $CCl_4$ | 13.0 |
| Total | 100.00 |

The gas is passed through the glass tube having an unobstructed passageway and into the Erlenmeyer flask, from which it then passes through the glass tube in which the glass wool plug has been inserted, both of the tubes being immersed in the cold alcohol. The gas issuing from the apparatus is then conducted to a magnesium perchlorate drying tube.

The temperature of the alcohol bath surrounding the glass tubes and the Erlenmeyer flask is so adjusted that the temperature of the gases therein is varied from a minimum of −25° C. to a maximum of approximately 0° C. Within this temperature range, a liquid condensate forms within the entry tube which condensate drains into the Erlenmeyer flask. The exit gases from the Erlenmeyer flask passing through the entrainment separator are found, when the temperature of the cooled gases is allowed to rise as high as 0° C., to contain a maximum of 2.5 mgs. of water moisture per liter of gas, as determined by absorption in magnesium perchlorate. At the minimum temperature of −25° C., the amount of moisture in the gases issuing from the cooling unit is found to be of the order of ½ mg. per liter. Within the above noted temperature range, no solid hydrate of chlorine is formed.

*Example II*

The effluent gases issuing from electrolytic cells used in the commercial production of chlorine and caustic soda by electrolysis of a sodium chloride brine are initially passed through a water-cooled condenser wherein the temperature of the gases is reduced to approximately 13° C., at which temperature a liquid condensate comprising water and a relatively small amount of chlorine separates from the gaseous mixture. The gas phase is separated from the liquid condensate and subsequently passed to a mixer, wherein an amount of HCl equivalent to approximately 0.14% of the volume of the gas phase is added thereto; the amount of water in the gaseous mixture at this point is calculated to be of the order of 1.5% by volume, giving a weight ratio of HCl to water of 1:18.5. Thereafter the gaseous mixture of chlorine, water, and hydrogen chloride is passed through a refrigeration cooler similar to that employed in Example I above wherein the mixture is cooled to temperatures varying within the range of −25° C. to 0° C., within which range the amount of water moisture remaining in the gas phase is found not to exceed 2½ mgs. per liter of gas when determined by the magnesium perchlorate absorption method.

As it is apparent and well known that the solid chlorine hydrate, the formation of which in drying of chlorine it is the principal object of the present invention to avoid, forms at about 10° C., and as it is further clear that any cooling below this temperature, which can be effected without the disadvantageous formation of the solid chlorine hydrate, will result in more efficient drying and will approach and ultimately surpass the efficiency and especially the convenience of the sulfuric acid system, the present invention includes the drying of chlorine in the presence of any quantity of hydrogen chloride at temperatures below 10° C. As noted above, the preferred conditions include treatment with HCl in an amount from 0.15 to 0.55 of the weight of water present in the gas mixtures at temperatures between −25° and 0° C.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of drying chlorine contained in a gaseous mixture comprising chlorine as the principal component, which includes the steps of introducing a small proportion, relative to the amount of water therein, of hydrogen chloride into said mixture, cooling the thus augmented gas mixture to a temperature between about +9° and about −34° C. and below the dew point of the water vapor-hydrogen chloride mixture, and separating the gas phase from the condensate formed during the aforesaid cooling step.

2. The method of obtaining anhydrous chlorine from a gaseous mixture comprising elemental chlorine as the principal component, which includes the steps of introducing hydrogen chloride into said mixture in an amount substantially within the range of 0.15 to 0.55 of the weight of the water vapor in said mixture, cooling the thus augmented gas mixture to a temperature between about +9° and about −34° C. and below the dew point of the water vapor-hydrogen chloride mixture, and separating the gas phase from the condensate formed during the aforesaid cooling step.

3. The method of obtaining anhydrous chlorine from a gaseous mixture comprising elemental chlorine as the principal component, which includes the steps of initially cooling said gas mixture to a temperature above 10° C. but below the dew point for the amount of moisture in said mixture, separating the gas phase from condensate which forms during the aforesaid cooling step, subsequently introducing a small proportion, relative to the amount of water vapor remaining in said mixture, of hydrogen chloride thereinto, cooling the thus augmented gas mixture to a temperature between about +9° and about −34° C. and below the dew point of the water vapor-hydrogen chloride mixture, and separating the gas phase from the condensate formed during the second cooling step.

4. The method of claim 3 in which the amount of hydrogen chloride introduced into said gas mixture prior to the second cooling step is substantially within the range of 0.15 to 0.55 of the weight of the water vapor therein.

CLAYTON L. DUNNING.

REFERENCES CITED

The following references are of record in the file of this patent:

UNITED STATES PATENTS

| Number | Name | Date |
|---|---|---|
| 85,370 | Deacon | Dec. 29, 1868 |
| 1,723,300 | Pritchard et al. | Aug. 6, 1929 |
| 2,318,512 | McHaffie | May 4, 1943 |

OTHER REFERENCES

"Hackh's Chemical Dictionary," 2nd ed., 1937, page 750, P. Blakiston's Son & Co., Inc., Phila., Pa.